Figure 1:
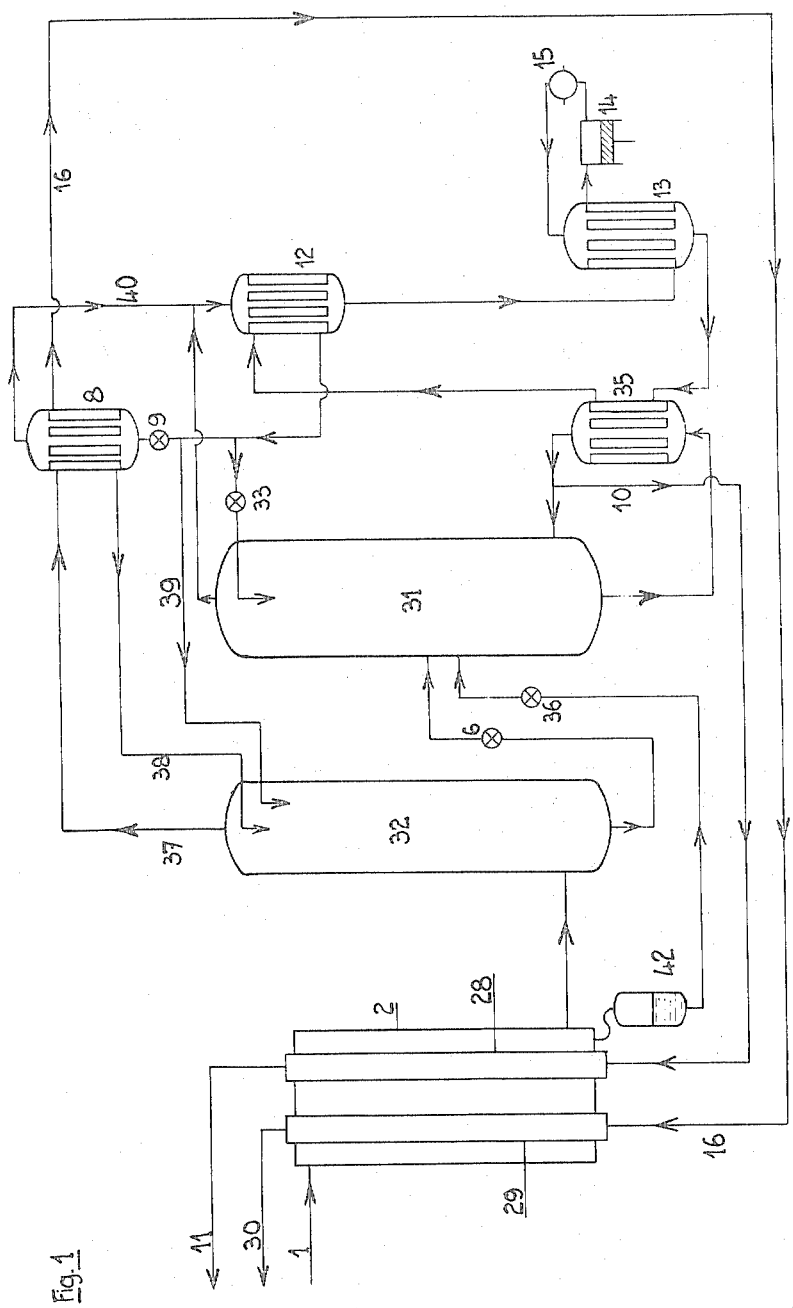

INVENTOR
JACQUES GRUNBERG
ATTORNEY

United States Patent Office 2,743,590
Patented May 1, 1956

2,743,590

METHOD FOR THE FRACTIONATION OF GAS MIXTURES

Jacques Grunberg, Outremont, Quebec, Canada, assignor to L'Air Liquide, Societe Anonyme pour l'Etude et l'Exploitation des Procedes Georges Claude, Paris, France Application November 29, 1952, Serial No. 323,258

2 Claims. (Cl. 62—175.5)

The invention relates to an improved method for the fractionation of gas mixtures containing components having different equilibrium constants. More specifically, it is concerned with a method for the separation at subatmospheric temperatures of the more easily liquefied components of gas mixtures such as coke oven gas, natural gases, refinery gases, etc.

In known methods, the mixtures to be separated are cooled under pressure by heat exchange with some separated products under lower pressure. This cooling results in the condensation in a liquid state of the less volatile parts of the mixture which may be then, either vaporized under a lower pressure to bring about the condensation of the more easily condensed components of the mixture, or rectified to yield some components in a purer state.

The pressure to which the mixture has to be compressed for its partial condensation depends, among other factors, upon the respective boiling points of the product used as cooling agent, and of the components to be condensed.

It is an object of this invention to allow the compression of the gas mixture only to a relatively low pressure, which reduces the power needed, permits the use of simpler and lighter compression equipment and gives better fractionation. As is known, under given conditions, the separation of a gas mixture is so much sharper as the separation pressure is lower.

This object is attained, chiefly by cooling the gas mixture to be separated, by heat exchange with a liquid more volatile than the portion to be condensed, in such a way that the mixture separates in one hand a gas containing chiefly the less easily condensable components, and on the other hand a liquid mixture, rectifying said liquid, thus yielding on one hand the more easily condensable portion and on the other hand a relatively volatile gaseous fraction, and liquefying said fraction thus forming the liquid by which the gaseous mixture to be separated is cooled, as aforesaid.

The cooling of the mixture to be separated by the relatively volatile liquid may be performed either by direct or indirect contact. In the case of the direct contact, the gas mixture ascends in a rectification column at the top of which the liquid is introduced; the less condensable fraction of the gas mixture issues as a gas at the upper portion of this column and is collected outside. In the case of the indirect contact, the gas mixture to be separated is preferably caused to ascend in a vertical bundle of tubes externally cooled by the relatively volatile liquid evaporating in a shell around the bundle. The liquid resulting from the condensation of the mixture flows back downwards in countercurrent with the ascending gas, is collected and then rectified.

The liquid used as cooling agent for the condensation is preferably not a pure separated component of the mixture but an intermediate product and, when vaporized in the contact with the gas mixture, is returned to a suitable point of the device.

Figure 1 shows a first schematic embodiment of the invention, wherein the condensation of the more condensable portions of the mixture is obtained partly in a conventional manner, and partly, according to the invention, by a direct contact with a relatively low boiling liquid.

Figure 2:
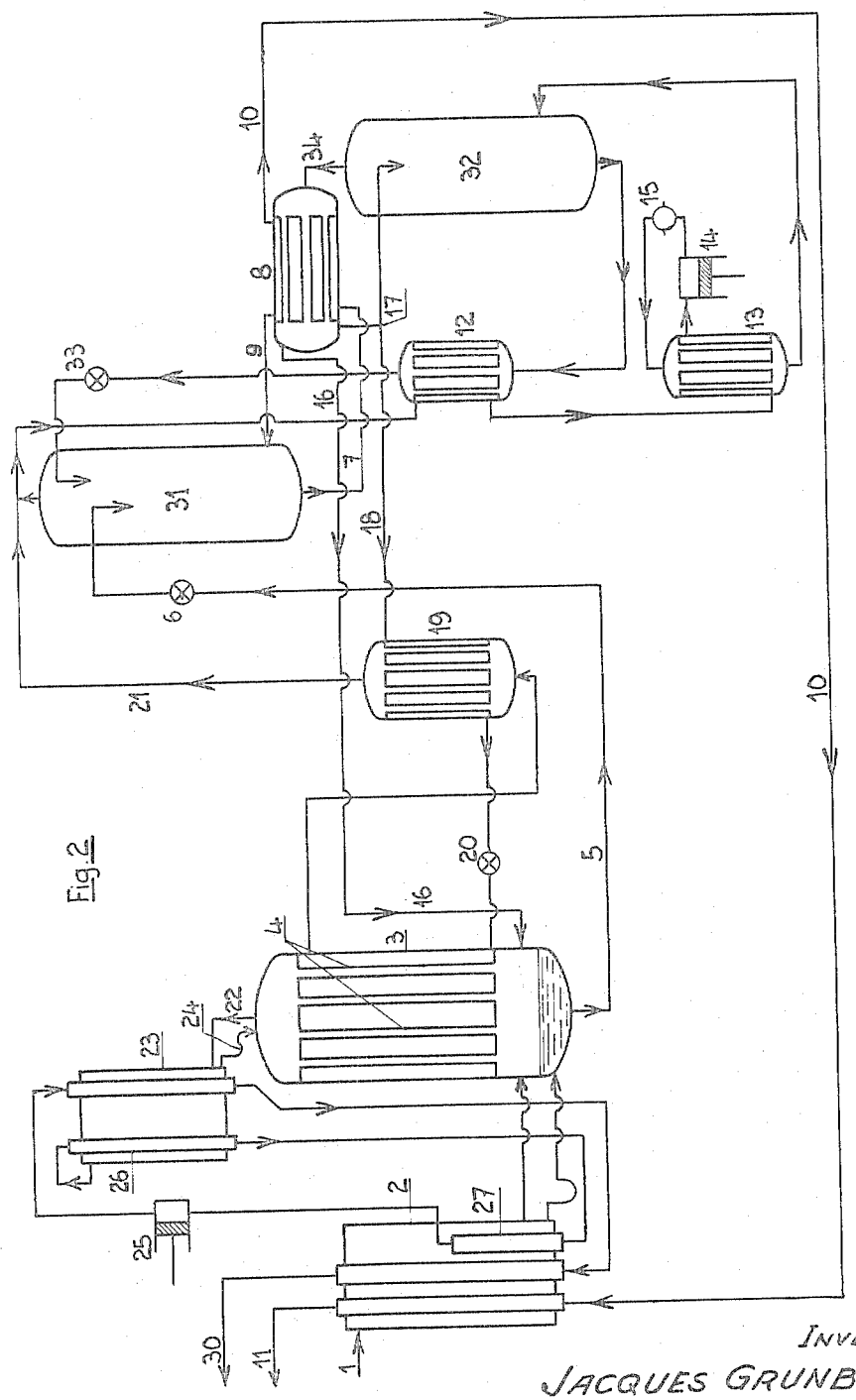

Figure 2 shows a second schematic embodiment wherein the condensation of the more condensable portions of the mixture is obtained, partly in a conventional manner and partly according to the invention, by an indirect contact with a relatively low boiling liquid; this last condensation being performed in a dephlegmating vertical bundle of tubes. The embodiment shown by Figure 2 includes moreover some particular features which will appear from the description.

Figure 3:
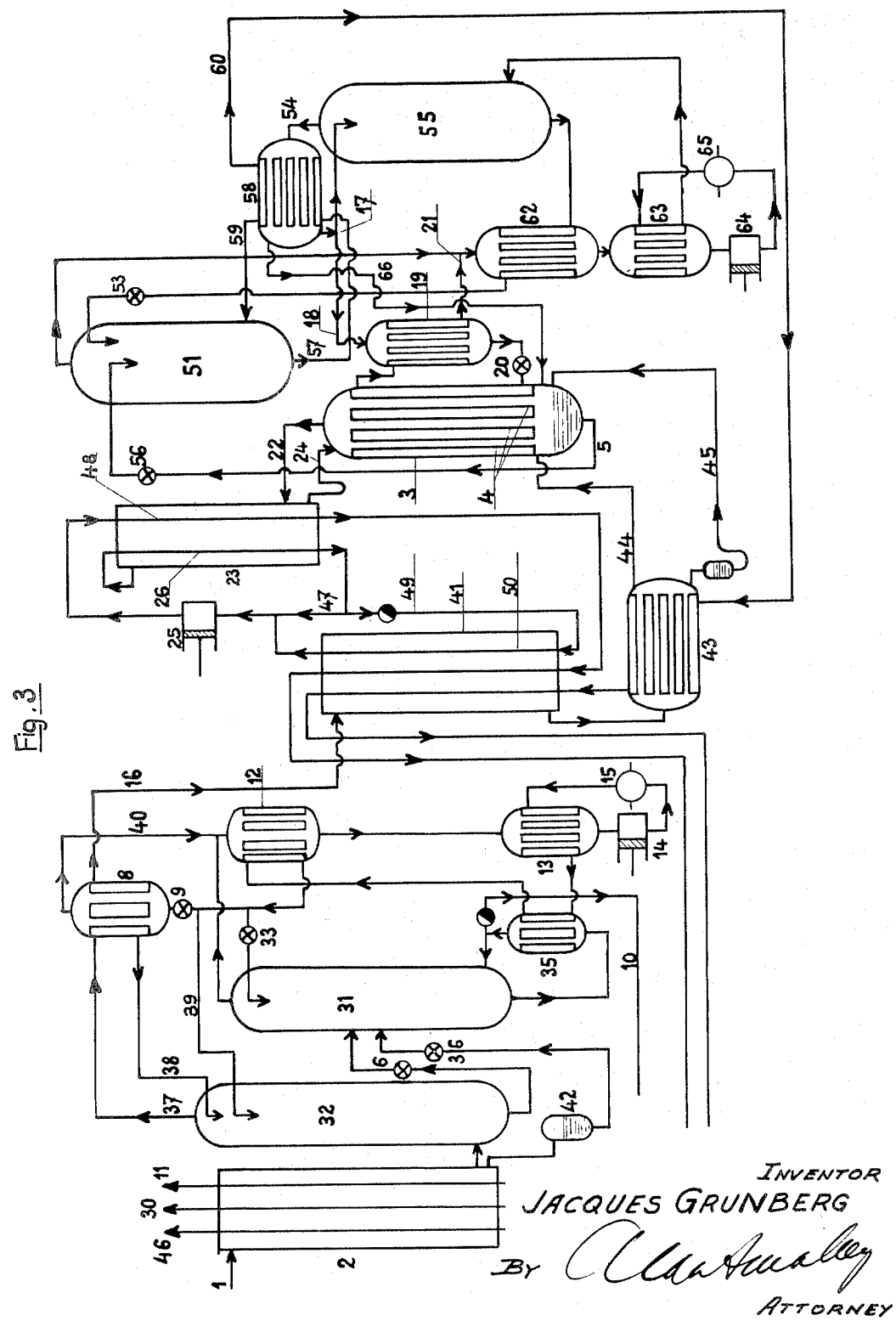

Figure 3 shows schematically a device wherein a gas mixture is separated in three fractions through two successive operations, each of them being performed according to one of the described embodiments, namely a first separation using the process illustrated by Figure 1 and giving up two fractions of different volatilities, then a second separation using the process illustrated by Figure 2, which separation is performed on the more volatile fraction resulting from the first separation so that the whole device delivers three fractions of different volatilities.

According to Figure 1, the mixture to be separated entering in 1, previously compressed and close to atmospheric temperature, is first cooled by the products resulting from the separation in the exchanger 2 in which there takes place a partial condensation of the most readily condensable elements, which are collected, in a liquid condition, in the container 42. The cooled gas mixture still containing part of these substances, enters the base of the column 32 wherein it ascends, being, in its ascension, partly condensed and rectified by liquids, the origin of which will be explained hereafter. These substances are driven down by the liquids towards the base of the column wherefrom a liquid issues containing essentially the whole of these heavier constituents, with a portion of the other constituents.

This liquid is expanded to about atmospheric pressure by the valve 6 and enters a second column which receives also the liquid condensed in the exchanger 2 and expanded through the valve 36.

From the top of the first column 32 issues, at 37, the initial mixture, from which the most condensable elements, have been removed. This gas mixture is partly condensed as a liquid in condenser 8 and cooled as it will be explained hereafter. The liquefied portion flows back to the column 32 through the tube 38 while the still gaseous portion issues by the tube 16, and is used in the bundle 29 to cool the exchanger 2 and issues from the apparatus, by the pipe 30.

The more easily condensed portions of the mixture are rectified in the low pressure column 31. In the bottom of this column, a liquid is collected. This liquid is vaporized in the condenser-vaporized 35 so providing the heating at the base of the column 31. The main portion of the formed vapours returns to the column 31, while a fraction forming the final product is withdrawn by the tube 10 and issues at 11 after having cooled the exchanger 2 in the bundle 28.

The gases, leaving the top of column 31 are first warmed up in exchanger 12, then in exchanger 13. The are then compressed to about 20 kilogs./cm.² by the compressor 14, cooled in the cooler 15 then in the exchanger 13 and are liquefied in the condenser-vaporizer 35, wherein the heat of liquefaction causes the vaporization of the liquid at the base of the column 31, which is thus heated. The liquid formed in the condenser-vaporizer 35 is cooled in the exchanger 12, then divided into three portions. The first one, expanded through the valve 33, is used as a washing liquid in column 31. A second portion derived through the tube 39 is used as a washing liquid in the column 32. The third portion, expanded through the valve 9 is vaporized in the condenser 8, so partly liquefying, by indirect contact, as above stated, the gases issuing from the column 32. The resulting vapours are recycled and, through the tube 40, join the gases issuing from the top of the column 31.

So there are delivered by the apparatus: on the one hand, at 11, a more easily condensed fraction containing the less volatile components, on the other hand, at 30, a fraction containing all the other components of the initial gas and which may be optionally separated in another apparatus, either similar or different.

The cold necessary in the apparatus is supplied by any means, particularly by an expansion with performance of external work of the least condensable fraction collected at 30.

According to Figure 2, the mixture previously compressed is cooled and partly liquefied in the heat exchanger 1 in counter-current with the products of the separation and enters the lower portion of the exchanger 3. To this lower portion, arrives also through a tube 16 recycled gas from the rectification apparatus, as will be set forth later. The gas mixture rises in the tubes 4 wherein it is partly condensed in a liquid state, the formed liquid flowing back towards the bottom and washing the rising gases, while the uncondensed portion issues at the top of exchanger 3 through a pipe 22. The formed liquid is collected at the base of the exchanger wherefrom it issues through a pipe 5. It is expanded to a pressure close to the atmospheric pressure by the valve 6. Thus expanded and partly vaporized, it enters the rectification column 31, operated under a pressure slightly above the atmospheric pressure. In this column, the mixture separates, yielding a portion with a relatively high boiling point. This portion leaves the base of the column, in a liquid condition, through a tube 7 and evaporates partially in the condenser-vaporizer 8; a portion of the gas resulting from this vaporization returning to the column with the nonvaporized liquid through a pipe 9 while the heavier product of the separation goes, issuing through the pipe 10, cools exchanger 2 before being collected outside through the tube 11.

From the top of column 31 issues, on the other hand, a relatively volatile fraction which is heated in an exchanger 12, then again in an exchanger 13 before being compressed to about 30 atm. by a compressor 14. The compression heat is dissipated in a cooler 15 and the compressed gas, after being cooled in exchanger 13 enters the base of the second rectification column 32, operated under a pressure of 30 atm. This column delivers: (1) from its base, a relatively less volatile liquid, which is cooled in the exchanger 12 by the gas fraction escaping from the top of the column 31, is then expanded through a valve 33 to the pressure of column 31 and is used as a reflux liquid in the same. (2) From its top, through tube 34, a relatively more volatile fraction which is condensed partly to a liquid condition in exchanger 8, the condensation heat being thus utilized for causing, at the base of column 31, the vaporization of the more condensable fraction.

The gas leaving the top of column 32 and not condensed in exchanger 8 leaves through a tube 16 and is utilized as will be indicated later on.

The condensed liquid is divided, at 17, into two portions, one of which makes up the necessary reflux at the top of column 32 while the other portion goes through a tube 18 to be cooled in exchanger 19, is expanded through a valve 20 to the pressure of column 32 and vaporizes in exchanger 3, thus providing, according to the invention, the partial condensation of the gas introduced therein, as above stated. The gas resulting from this vaporization is heated in exchanger 19 while cooling the liquid under pressure arriving through tube 18, then joins, through a tube 21, the gases issuing from the top of column 31, so re-entering into the cycle and going to the compressor 14, through exchangers 12 and 13.

The gas issuing from exchanger 8 through tube 16 is led to the base of the exchanger 3 wherein it rises in the tubes 4, jointly with the mixture to be separated. Being subjected, in this tubes, to a low temperature resulting from the evaporation at low pressure of the volatile liquid condensed in 8, the ascending gases are partly condensed and the produced liquid feeds, as above mentioned, the column 31. The residual gases from this condensation issue from the top of the exchanger 3 through a tube 22. They are cooled again in an exchanger 23, whence results the condensation of the less volatile products they still contained, which condensed products return to exchanger 3 through a pipe 24. The exchanger 23 is cooled by the gas itself, expanded with external work in an expansion machine 25. For this purpose, the gas deprived from its less volatile components is warmed up in a bundle 26 located in the exchanger 23. It is reheated in a special bundle 27 of the exchanger 2, then expanded with external work in the expansion machine 25. Thus cooled to a low temperature, it yields its cold first to exchanger 23 then to exchanger 2, from which issues at 30 close to the ambient temperature and under the atmospheric pressure, as more volatile fraction of the mixture.

It is to be seen that the embodiment shown by Figure 2 is characterized by the following features:

(a) Partial condensation of the mixture to be separated in a dephlegmating bundle which condensation is performed by the operation known as "liquefaction by backward return."

(b) Rectification of the so condensed portion in a set of two thermally bound columns 31 and 32, this set being fed on the lower pressure column 31.

(c) Utilization as cooling liquid for the condensation according to the invention, of a part of the liquid resulting from the condensation of the gases ascending in the higher pressure column 32, which condensation is performed by heat exchange (in exchanger 8) with the more condensable fraction of the mixture boiling in the bottom of the lower pressure column 31.

(d) Final purification of the less condensable fraction of the mixture when issuing from the top of the dephlegmating bundle 4, due to a cooling (in exchanger 23) by the expanded purified gas.

Figure 3 shows schematically, by way of example, the separation of an oil refinery gas with about the following composition:

| | |
|---|---|
| Hydrogen and nitrogen | 23 |
| Methane | 27 |
| Ethylene | 15 |
| Ethane | 24 |
| Propylene | 6 |
| Propane | 5 | which gas is to be separated in three fractions, namely a less volatile fraction, made up with propane and propylene, a middle fraction made up substantially with ethane and ethylene, and a more volatile fraction comprising hydrogen, nitrogen and methane.

As above mention, the mixture is firstly fractionated according to the process illustrated by Figure 1, i. e. a process including a direct contact of the mixture with a liquid originated from this mixture by the above described way. This first separation gives up, on one hand, the last volatile fraction of the mixture, issuing from the apparatus by the pipe 11 which fraction is made up with propane and propylene, and on the other hand, a mixture including the other components which mixture corresponds to the fraction issuing on Figure 1, from the exchanger 8 by the pipe 16.

In Figure 3, the left part of which is substantially similar to Figure 1, the same reference numerals as in Figure 1 have been used, so that it is deemed useless to describe this part again. The only difference is that the gas issuing from exchanger 8 by pipe 16 is fractionated in the right part of the Figure, instead of issuing from the apparatus by pipe 11 of Figure 1.

This gas issuing from exchanger 8 with substantially the following composition:

Hydrogen and nitrogen _____ 26
Methane _____ 30
Ethylene _____ 17
Ethane _____ 27 is cooled in an exchanger 41, then in a second exchanger 43 wherein it is partly condensed. Both condensed liquid and remaining gas are introduced respectively by pipes 44 and 45 at the lower part of an exchanger 3 wherein the gas ascends in tubes 4, wherein it is cooled and partly liquefied by heat exchange with a liquid vaporizing around said tubes. The condensed liquid flows back downwards, so washing the ascending gas, and is collected in the bottom of the exchanger, where it joins the liquid arriving by pipe 45 from the exchanger 43.

The liquid issues through the pipe 5 from the base of exchanger 3. It is expanded to a pressure close to atmospheric pressure by a valve 56. So expanded and partly vaporized, it enters the rectification column 51, operated under a pressure slightly above atmospheric pressure. This column delivers, at its lower part through pipe 57, a liquid, substantially made up of ethylene and ethane. This liquid evaporates partially in a condenser-vaporizer 58, a portion of the resulting gas returning to the column with the non vaporized liquid through a pipe 59, while the remaining gas portion making up the middle condensable fraction of the mixture, issuing by pipe 60 from exchanger 58, cools in succession the exchangers 43, 41 and 2 and issues from the apparatus by pipe 46 at about the atmospheric pressure.

From the top of column 51 issues a gaseous mixture with the approximate composition:

Hydrogen and nitrogen _____ 1.5
Methane _____ 52.5
Ethylene _____ 30
Ethane _____ 16

This gas is heated in exchanger 62, then again in an exchanger 63 before being compressed to about 30 atm. by a compressor 64. The compression heat is dissipated in a cooler 65 and the compressed gas, after being cooled in exchanger 63 enters the base of the second rectification column 55, operated under a pressure of 30 atm. This column delivers: (1) from its base, a relatively less volatile liquid, which is cooled in exchanger 62 by the gas fraction escaping from the top of the column 51, is then expanded through a valve 53 to the pressure of column 51 and is used as a reflux liquid in the same. (2) From its top, through tube 54, a relatively more volatile fraction which is condensed partly to a liquid condition in exchanger 58, the condensation heat being thus utilized for bringing about, at the base of column 51, the vaporization of the more condensable fraction.

The gas leaving the top of column 55 and not condensed in exchanger 58 leaves through a tube 66 and is utilized as will be indicated later on.

The condensed liquid divided, at 17, into two portions, one of which makes up the necessary reflux at the top of column 55 while the other portion goes through a tube 18 to be cooled in exchanger 19, is expanded through a valve 20 to the pressure of column 55 and vaporizes in exchanger 3, thus providing, according to the invention, the partial condensation of the gas introduced therein, as above stated. The gas resulting from this vaporization is heated in exchanger 19 while cooling the liquid under pressure arriving through tube 18, then joins, through a tube 21, the gases issuing from the top of column 51, so re-entering into the cycle and going to the compressor 64, through exchangers 62 and 63.

The gas, leaving under pressure the top of column 55 and not condensed in exchanger 58, issues therefrom through the tube 66, and is led to the lower part of exchanger 3, wherein it ascends in tubes 4, jointly with the gas arriving by pipe 44. The gas having escaped the condensation in tubes 4 issues from the top of exchanger 3 through a pipe 22, at a temperature of about —100° C. It is cooled again in an exchanger 23, whence results the condensation of substantially all the ethylene and ethane it still contained, which condensed products flow back to exchanger 3 by pipe 24. Exchanger 23 is cooled by the gas itself to be cooled. For this purpose, the gas deprived of ethylene and ethane and issuing from exchanger 23, is warmed up in a bundle of tubes 26 located in exchanger 23, then is led by a pipe 47 to an expansion machine 25 wherefrom it issues at a lower temperature. It cools exchanger 23 by passing therethrough in a bundle 48, cools then exchangers 41 and 2 and issues at 30. The temperature of the gas to be expanded in the expansion machine may be adjusted by deriving a part thereof through the pipe 49 and the bundle 50 located in exchanger 41, then returning the so reheated part to the expander 25.

What I claim is:

1. A method for the condensation at low temperature of the more easily condensable portion of a gaseous mixture comprising, cooling and partially liquefying the compressed gas mixture by heat exchange with at least one cold expanded output component, rectifying under pressure the gaseous residue of the above mentioned partial liquefaction, said rectification yielding on one hand a gas made up with the less condensable portion of the gaseous mixture and on the other hand a liquid, expanding said liquid and rectifying it, under a lower pressure than the one for the first said rectification, in a device receiving also the liquid resulting from the above mentioned partial liquefaction of the compressed gas mixture, this second rectification yielding on one hand the most condensable portion of the gaseous mixture and on the other hand a gas, which is then compressed, cooled by heat exchange with the same gas before its compression, liquefied by heat exchange with the more condensable portion of the gas mixture, then cooled by heat exchange with the gas resulting from the second rectification, and divided in three portions of which two are used as washing liquids for the two mentioned rectifications and the third expanded and used as a cooling mean to partly condense in an indirect contact the mentioned gas yielded by the first rectification, the resulting liquid being used as a reflux in this rectification.

2. A method for the separation at low temperature of the more easily condensable portion of a gaseous mixture comprising, cooling the compressed gas mixture by indirect heat exchange with a liquid derived from the separation in such a way that the mixture is separated in a gaseous fraction and a liquid, expanding said liquid, introducing it into a first rectification column operated at a relatively low pressure, and yielding on one hand the more condensable portion of the gaseous mixture to be separated and on the other hand a gas, compressing said gas, cooling it by heat exchange with the same gas before its compression, introducing the compressed and cooled gas into a second rectification column operated under a higher pressure than the first column, both columns being thermically bound by a common condenser-vaporizer, the second column yielding on one hand a liquid and on the other hand a gas, expanding last said liquid and using it as a washing liquid in the first column, cooling and liquefying at least partly last said gas in the above mentioned condenser-vaporizer by heat exchange with the boiling more condensable portion of the gaseous mixture, dividing in two parts the resulting liquid, using one of these parts as a washing liquid in the second column, expanding the second part and using it as cooling liquid in an indirect heat exchange for the initial compressed gas mixture as above mentioned, and uniting the gas resulting from the vaporization of this cooling liquid in the said exchange with the mentioned gas yielded by the first rectification column.

References Cited in the file of this patent

UNITED STATES PATENTS

| | | |
|---|---|---|
| 2,258,016 | Keith et al. | Oct. 7, 1941 |
| 2,487,147 | Latchum | Nov. 8, 1949 |
| 2,495,549 | Roberts | Jan. 24, 1950 |